United States Patent
Gallmeyer et al.

(10) Patent No.: US 6,400,062 B1
(45) Date of Patent: Jun. 4, 2002

(54) METHOD AND APPARATUS FOR TEMPERATURE COMPENSATING A PIEZOELECTRIC DEVICE

(75) Inventors: Christopher F. Gallmeyer; Larry G. Waterfield, both of Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/532,328

(22) Filed: Mar. 21, 2000

(51) Int. Cl.[7] ............................................. H01L 41/08
(52) U.S. Cl. ..................................... 310/315; 310/348
(58) Field of Search ................................ 310/315, 348

(56) References Cited

U.S. PATENT DOCUMENTS

| | | | |
|---|---|---|---|
| 4,267,478 A | * 5/1981 | Ljung et al. ................. 310/315 |
| 4,451,710 A | 5/1984 | Taylor et al. ............. 179/110 A |
| 4,469,974 A | 9/1984 | Speranza ..................... 310/316 |
| 4,502,438 A | 3/1985 | Yasuhara .................... 123/357 |
| 4,565,940 A | 1/1986 | Hubbard, Jr. ............... 310/326 |
| 4,639,697 A | 1/1987 | Yarranton et al. .......... 333/155 |
| 4,688,536 A | 8/1987 | Mitsuyasu et al. ......... 123/490 |
| 4,705,003 A | 11/1987 | Sakakibara et al. ........ 123/449 |
| 4,816,743 A | 3/1989 | Harms et al. ................. 324/56 |
| 4,853,578 A | * 8/1989 | Takahashi et al. .......... 310/315 |
| 4,868,447 A | 9/1989 | Lee et al. .................... 310/328 |
| 4,996,960 A | 3/1991 | Nishiyama et al. ......... 123/435 |
| 5,043,621 A | 8/1991 | Culp .......................... 310/316 |
| 5,053,668 A | 10/1991 | Mitsuyasu ................... 310/317 |
| 5,123,331 A | 6/1992 | Hirai ......................... 91/363 A |
| 5,130,619 A | 7/1992 | Izuno ......................... 318/116 |
| 5,201,296 A | 4/1993 | Wunning et al. ........... 123/479 |
| 5,214,668 A | 5/1993 | Satou et al. ................. 374/117 |
| 5,270,960 A | 12/1993 | Ikegami et al. ........ 364/571.03 |
| 5,271,313 A | 12/1993 | Lindegren, III ........... 91/358 R |
| 5,344,117 A | 9/1994 | Trah et al. .................... 251/11 |
| 5,359,975 A | 11/1994 | Katashiba et al. ........... 123/435 |
| 5,375,576 A | 12/1994 | Ausman et al. ............. 123/446 |
| 5,471,721 A | 12/1995 | Haertling .................... 29/25.35 |
| 5,477,831 A | 12/1995 | Akaki et al. ................ 123/490 |
| 5,479,062 A | 12/1995 | Yoshino ..................... 310/316 |
| 5,486,997 A | 1/1996 | Reismiller et al. .......... 364/165 |
| 5,557,154 A | 9/1996 | Erhart ........................ 310/80 |
| 5,632,841 A | 5/1997 | Hellbaum et al. .......... 156/245 |
| 5,668,506 A | * 9/1997 | Watanabe et al. ............. 331/66 |
| 5,677,485 A | 10/1997 | Nakamura .................... 73/497 |
| 5,714,831 A | 2/1998 | Walker et al. .............. 310/316 |
| 5,722,373 A | 3/1998 | Paul et al. ................... 125/446 |
| 5,864,066 A | 1/1999 | Kim ............................. 73/658 |
| 5,875,764 A | 3/1999 | Kappel et al. .............. 123/467 |
| 5,880,565 A | 3/1999 | Watanabe ................... 318/139 |
| 5,945,768 A | 8/1999 | Treu, Jr. .................. 310/316.01 |

FOREIGN PATENT DOCUMENTS

| | | |
|---|---|---|
| DE | 3809284 | 9/1989 |
| DE | 19929589 | 1/2000 |
| DE | 19848950 | 4/2000 |

* cited by examiner

*Primary Examiner*—Brian Sircus
*Assistant Examiner*—Michael C. Zarroli
(74) *Attorney, Agent, or Firm*—Wood, Herron & Evans; Clifton G. Green; Kelsey L. Milman

(57) ABSTRACT

A control system for temperature compensating a piezoelectric device. The control system includes a temperature compensating circuit that is operable to receive a control signal corresponding to a desired position of the piezoelectric device and compensate the control signal in response to an estimated temperature proximate the piezoelectric device. A piezoelectric device control circuit is operable to receive the temperature compensated control signal and generate a control signal that is adapted to drive the piezoelectric device to the desired position. The temperature proximate the piezoelectric device may be estimated from an estimated ferroelectric polarization of the piezoelectric device or from a temperature sensor.

10 Claims, 2 Drawing Sheets

METHOD AND APPARATUS FOR TEMPERATURE COMPENSATING A PIEZOELECTRIC DEVICE

TECHNICAL FIELD

The present invention relates generally to piezoelectric devices and, more particularly, to an apparatus and method for accurately controlling movement of a piezoelectric device under varying operating temperatures.

BACKGROUND ART

Piezoelectric devices alter their shape in response to an applied electric field. An electric field applied in the direction of polarization effects an expansion of the piezoelectric material in the same direction, while a voltage applied in the opposite direction of polarization will cause a contraction of the material in that same direction. Piezoelectric bending actuators, such as thermally pre-stressed bending actuators, use the "bending" action of the actuator to convert electrical energy into mechanical energy.

Due to the nature of their construction, however, the performance of these devices is temperature dependent and presents a problem in applications such as an engine system where the temperature of the actuator may range from 0° C. to 100° C. during operation. In this wide temperature range, the position of the actuator changes as a function of applied voltage and temperature so the actuator must be temperature compensated to provide a consistent, reliable and predictable movement or displacement of the actuator in response to the input command signal.

In the past, piezoelectric actuators applied as fuel system actuators were temperature compensated by mechanical means, such as by hydraulic compensation. These mechanical methods require complex designs that add significant product cost and decrease the reliability of the valve control system.

Thus, there is a need for a piezoelectric actuator that eliminates the need for complex and unreliable mechanical devices to provide temperature compensation of the actuator. There is also a need for a piezoelectric actuator that may be accurately and reliably driven to a desired position in a relatively wide temperature range of the actuator.

DISCLOSURE OF THE INVENTION

While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, a control system for temperature compensating a piezoelectric device includes a temperature compensating circuit that is operable to receive a control signal from a control signal source that corresponds to a desired position of the piezoelectric device. The temperature control circuit is operable to generate a temperature corrected or compensated control signal in response to an estimated temperature proximate the piezoelectric device. A piezoelectric control circuit is coupled to the temperature compensating circuit and operable to generate a control signal in response to the control signal generated by the temperature control circuit to drive the piezoelectric device to the desired position in response to the estimated temperature of the piezoelectric device.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

BEST MODE FOR CARRYING OUT THE INVENTION

Figure 1:
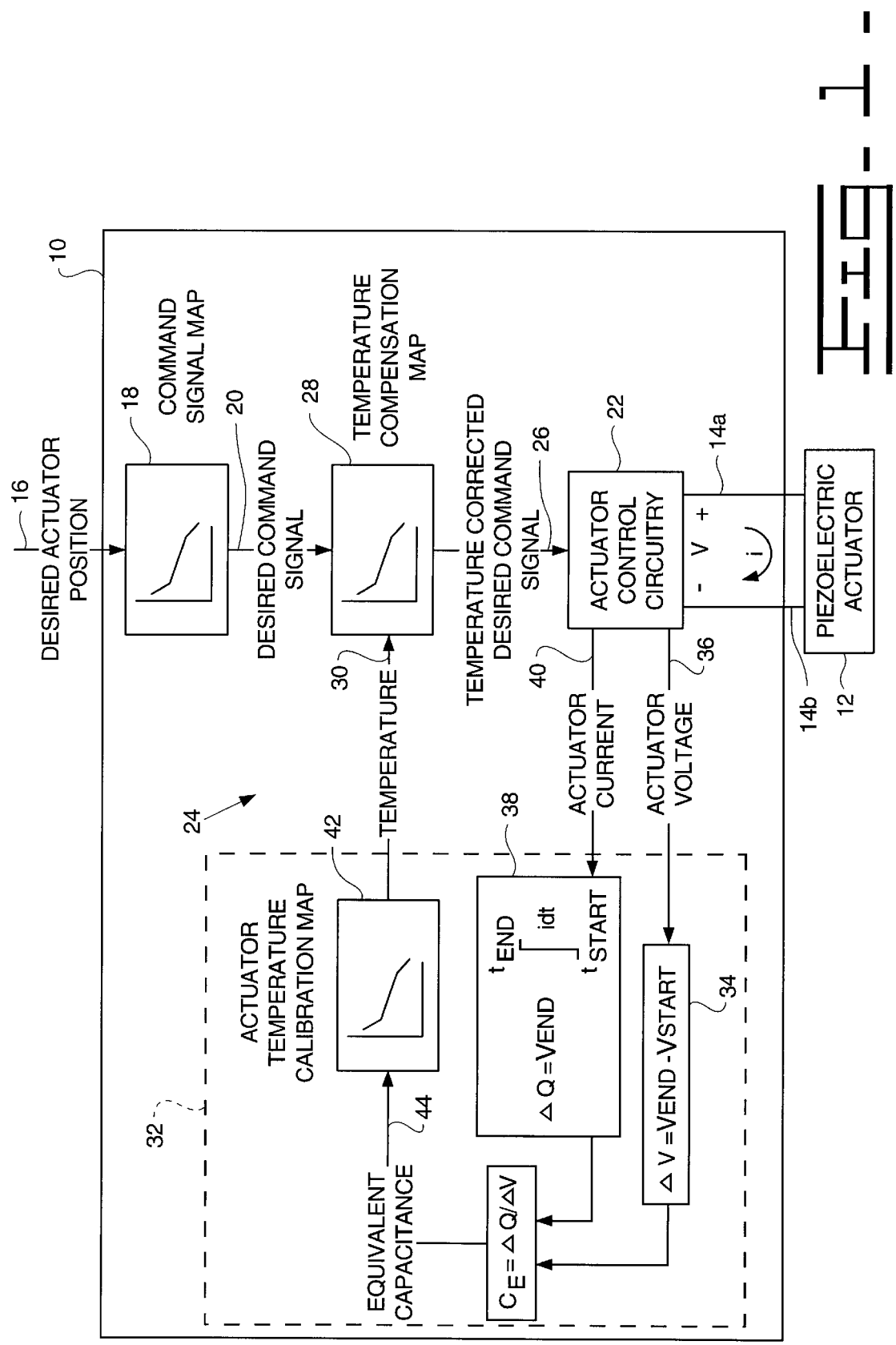
FIG. 1 is a block diagram of a control system for temperature compensating a piezoelectric device in accordance with the principles of the present invention.

With reference to the figures, and to FIG. 1 in particular, a control system 10 is shown in accordance with the principles of the present invention for temperature compensating a piezoelectric device 12, such as a thermally pre-stressed bending actuator, that is coupled to the control system 10 through a pair of leads 14a, 14b. As will be described in detail below, control system 10 is operable to receive a control signal on line 16 from a control signal source (not shown) that corresponds to a desired position of the actuator 12. In response to the control signal on line 16, the control system 10 applies a voltage related control signal to the actuator 12 that has been appropriately compensated in response to an estimated temperature proximate the operating environment of the actuator device 12. In this way, the control system 10 accurately controls displacement of actuator 12 in response to receipt of the control signal on line 16 from the control signal source (not shown) over a range of actuator operating temperatures. While not shown, it will be appreciated that the control signal source may be any position control system that can control the position of a piezoelectric device through a control signal.

Further referring to FIG. 1, control system 10 includes a one-dimensional empirical map or data structure 18 that is operable to receive the desired actuator position control signal on line 16 from the control signal source (not shown) as an input to the map 18. In response to receipt of the control signal on line 16, the data structure 18 generates as an output on line 20 a desired control signal that is electrically compatible with a conventional actuator control circuit 22 readily known to those skilled in the art. Data structure 18 may be a look-up table stored in RAM or ROM, a software algorithm or a hardwired circuit as will be readily appreciated by those skilled in the art that is operable to generate as an output on line 20 the desired control signal having a value or parameter defined by the empirical map 18 in response to the desired actuator position control signal on input line 16.

In accordance with the principles of the present invention, control system 10 includes a temperature compensating circuit, indicated generally at 24, that is coupled to the data structure or map 18 and the actuator control circuit 22. The temperature compensating circuit 24 is operable to receive the control signal on line 20 generated as an output of the data structure 18, and to generate a temperature compensated control signal on line 26 that is corrected or compensated in response to an estimated temperature proximate the operating environment of the piezoelectric device 12.

In particular, there is a hysteresis involved in the relationship between the magnitude of the control signal applied to the actuator 12, i.e., the control voltage, and the displacement of the actuator 12 in response to that control signal. Since piezoelectric devices are not linear gain devices, the physical motion profile of the device is not directly proportional to the profile of the control signal applied to the actuator. Moreover, the hysteresis curve is temperature dependent so that an input control signal applied to an actuator to produce a desired displacement at one temperature of the actuator will not produce the same displacement of the actuator at a different temperature. To this end, the temperature compensating circuit 24 is operable to correct or compensate the control signal on line 20 in response to the estimated temperature proximate the operating environment of the actuator 12 to generate a temperature corrected or compensated control signal on line 26 that will drive the actuator 12 to the desired position or displacement at the estimated temperature proximate the actuator.

In particular, the temperature compensating circuit 24 of control system 10 includes a two-dimensional empirical map or data structure 28 that is operable to receive the desired actuator position control signal on line 20 from the one-dimensional map or data structure 18 as an input to the map 28. The map 28 is also operable to receive an estimated temperature proximate the actuator 12 on line 30 as another input to the map 28. In response to receipt of the desired actuator position control signal on line 20 and the estimated temperature proximate the actuator 12 on line 30, the data structure 28 generates as an output on line 26 the temperature corrected or compensated control signal that will drive the actuator 12 to the desired position or displacement in response to the estimated temperature proximate the actuator 12. The temperature corrected or compensated control signal on line 26 is coupled to the actuator control circuit 22 to drive the actuator 12 to the desired position or displacement at the estimated temperature proximate the actuator 12. Data structure 28 may also be a look-up table stored in RAM or ROM, a software algorithm or a hardwired circuit as will be readily appreciated by those skilled in the art that is operable to generate as an output on line 26 the temperature corrected or compensated control signal on line 26 having a value or parameter defined by the empirical map 28 in response to the desired control signal on input line 20 and the estimated temperature proximate the actuator 12 on input line 30.

In accordance with one aspect of the present invention, the temperature proximate the actuator 12 may be estimated from an estimated ferroelectric polarization of the actuator 12. More particularly, the temperature compensating circuit 24 of control system 10 typically includes a polarization estimating circuit, indicated generally at 32, that is coupled to the data structure or map 28 and the actuator control circuit 22. For a given duration of time, the polarization estimating circuit 32 measures the change in applied voltage to the actuator 12 (V) through a comparator circuit 34 coupled to the actuator control circuit 22 through line 36. During that same duration of time, the polarization estimating circuit 32 measures the change in charge on the actuator 12 (Q) through a current integrating circuit 38 coupled to actuator control circuit 22 through line 40. From the measured V and Q values, an equivalent capacitance of the actuator 12 ($C_E$) is determined by the following equation, where the equivalent capacitance ($C_E$) is dependent on the physical construction of the actuator 12 and on the temperature proximate the operating environment of the actuator 12:

$$C_E = Q/V$$

To ensure an accurate estimation of the equivalent capacitance ($C_E$), V should be a significant portion (for example, >50%) of the full travel range of the actuator 12. The voltage vs. charge hysteresis curve of the actuator will determine the minimum value of V that can be used in this calculation without a loss of accuracy.

The polarization estimating circuit 32 of control system 10 includes a one-dimensional empirical map or data structure 42 that is operable to receive the equivalent capacitance ($C_E$) on line 44 as an input to the map 42. The empirical map or data structure 42 is preferably derived from the ferroelectric polarization hysteresis curves of the actuator 12 to generate the estimated temperature on line 30. The equivalent capacitance ($C_E$) effectively gives a unique slope value on the ferroelectric polarization hysteresis curves that can be correlated to the estimated temperature proximate the actuator 12 as will be appreciated by those skilled in the art. Data structure 42 may also be a look-up table stored in RAM or ROM, a software algorithm or a hardwired circuit as will be readily appreciated by those skilled in the art that is operable to generate as an output on line 30 the estimated temperature having a value or parameter defined by the empirical map 42 in response to the equivalent capacitance ($C_E$) on input line 44.

Figure 2:
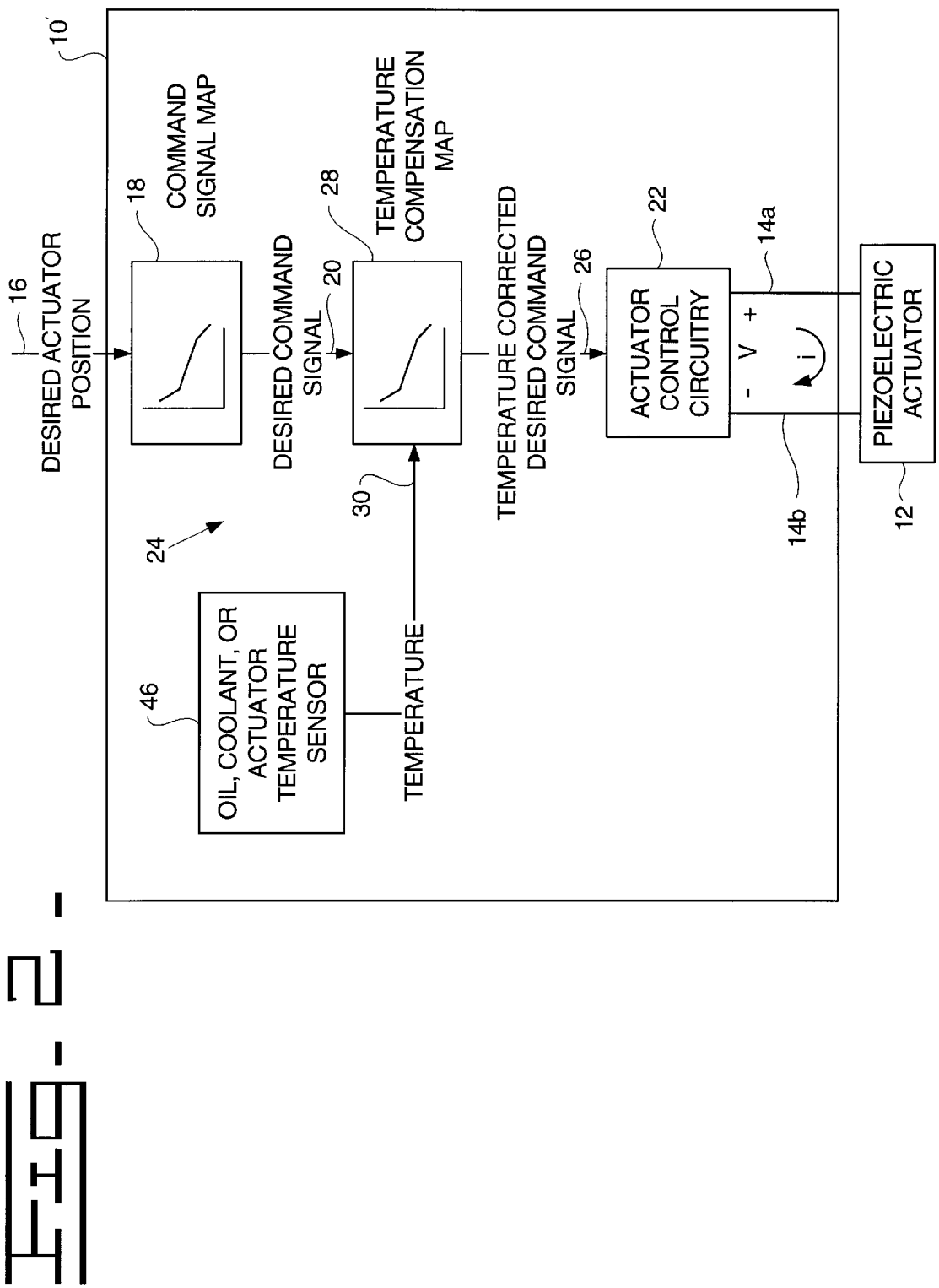
FIG. 2 is an alternative embodiment of the temperature compensating control system shown in FIG. 1.

Alternatively, as shown in FIG. 2 where like numerals represent like parts, a control system 10' is shown in accordance with another aspect of the present invention for temperature compensating the actuator 12. In this embodiment, the polarization estimating circuit 32 of FIG. 1 is replaced with a temperature sensor 46 that is adapted to be mounted in the general operating environment of the actuator 12. For example, in an engine system, the temperature sensor 46 could be mounted to sense engine oil or coolant temperature, or the sensor could be mounted directly on the actuator 12. In this way, the sensor 46 generates an estimated temperature proximate the operating environment of actuator 12 as an input on line 30 to the two-dimensional empirical map or data structure 28. The map 28 is operable to receive the desired actuator position control signal on line 20 from the one-dimensional map or data structure 18 as an input to the map 28. The map 28 is also-operable to receive the estimated temperature proximate the actuator 12 on line 30 as another input to the map 28. In response to receipt of the desired actuator position control signal on line 20 and the estimated temperature proximate the actuator 12 on line 30, the data structure 28 generates as an output on line 26 the temperature corrected or compensated control signal that will drive the actuator 12 to the desired position or displacement in response to the estimated temperature proximate the actuator 12. The temperature corrected or compensated control signal is coupled on line 26 to the actuator control circuit 22 to drive the actuator 12 to the desired position or displacement at the estimated temperature proximate the actuator.

INDUSTRIAL APPLICABILITY

In use, it will be appreciated that control system 10 is operable to provide a temperature corrected or compensated control signal to the actuator 12 to drive the actuator 12 to the desired position or displacement in response to the estimated temperature proximate the actuator. The temperature compensating circuit 24 of control system 10 eliminates the need for complex and unreliable mechanical devices to provide temperature compensation of the actuator 12. Additionally, the polarization estimating circuit 32 of FIG. 1 eliminates the need for a temperature sensor 46 (FIG. 2) to estimate the temperature proximate the operating environment of the actuator 12. The control system 12 of the present invention provides accurate movement control of the actuator 12 under varying operating temperatures.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

Other aspects, objects and advantages of the present invention can be obtained from a study of the drawings, the disclosure and the appended claims.

What is claimed is:

1. An apparatus for temperature compensating a piezoelectric device, comprising:
    a temperature compensating circuit operable to receive a first control signal corresponding to a desired position of the piezoelectric device and generate a second control signal in response to the first control signal that is compensated in response to an estimated temperature proximate the piezoelectric device;
    a piezoelectric device control circuit coupled to said temperature compensating circuit and operable to receive the second control signal and generate a third control signal in response to the second control signal that is adapted to drive the piezoelectric device to the desired position,
    wherein said temperature compensating circuit includes a first data structure operable to correlate the first control signal with the estimated temperature proximate the piezoelectric device to generate the second control signal, and
    wherein said temperature compensating circuit further includes a polarization estimating circuit coupled to said piezoelectric device control circuit and operable to estimate ferroelectric polarization of the piezoelectric device.

2. The apparatus of claim 1 wherein said temperature compensating circuit further includes a second data structure operable to estimate the temperature proximate the piezoelectric device from the estimated ferroelectric polarization of the piezoelectric device.

3. The apparatus of claim 1 wherein said polarization estimating circuit includes a comparator circuit operable to measure a change in voltage applied to the piezoelectric device over a predetermined duration of time.

4. The apparatus of claim 3 wherein said polarization estimating circuit further includes an integrator circuit operable to integrate current flowing in the piezoelectric device over the predetermined duration of time.

5. An apparatus for temperature compensating a piezoelectric device, comprising:
    a first data structure operable to correlate a first control signal corresponding to a desired position of the piezoelectric device with an estimated temperature proximate the piezoelectric device to generate a second control signal in response to the first control signal that is compensated in response to the estimated temperature proximate the piezoelectric device;
    a piezoelectric device control circuit operable to receive the second control signal and generate a third control signal in response to the second control signal that is adapted to drive the piezoelectric device to the desired position; and
    a polarization estimating circuit coupled to said piezoelectric device control circuit and operable to estimate ferroelectric polarization of the piezoelectric device.

6. The apparatus of claim 5 further including a second data structure operable to estimate the temperature proximate the piezoelectric device from the estimated ferroelectric polarization of the piezoelectric device.

7. The apparatus of claim 5 wherein said polarization estimating circuit includes a comparator circuit operable to measure a change in voltage applied to the piezoelectric device over a predetermined duration of time.

8. The apparatus of claim 7 wherein said polarization estimating circuit further includes an integrator circuit operable to integrate current flowing in the piezoelectric device over the predetermined duration of time.

9. A method of temperature compensating a piezoelectric-device, comprising:
    receiving a first control signal that corresponds to a desired position of a piezoelectric device;
    estimating temperature proximate the piezoelectric device;
    generating a control signal adapted to drive the piezoelectric device to the desired position, wherein the control signal is temperature compensated in response to the estimated temperature proximate the piezoelectric device;
    estimating ferroelectric polarization of the piezoelectric device; and estimating temperature proximate the piezoelectric device from the estimated ferroelectric polarization of the piezoelectric device.

10. The method of claim 9 further comprising:
    providing a second data structure operable to estimate temperature proximate the piezoelectric device from the estimated ferroelectric polarization of the piezoelectric device.

* * * * *